UNITED STATES PATENT OFFICE.

JOSEPH HAY AMIES, OF PHILADELPHIA, PENNSYLVANIA.

METHOD OF MAKING A CEMENTITIOUS PLASTIC COMPOSITION.

1,150,481.  Specification of Letters Patent.  Patented Aug. 17, 1915.

No Drawing.  Application filed December 30, 1914. Serial No. 879,704.

*To all whom it may concern:*

Be it known that I, JOSEPH HAY AMIES, a citizen of the United States, residing at Philadelphia, in the county of Philadelphia and State of Pennsylvania, have invented a certain new and useful Method of Making a Cementitious Plastic Composition, of which the following is a specification, the same being a continuation in part of my application for patent, Serial No. 805,509.

This invention relates to a cementitious plastic composition, concrete or mortar which may be used, among other things, for making waterproof artificial stone, bricks, walls, partitions, floors, roofing and paving compositions, and which may be used as a plastering compound.

It is known that compositions containing pitchy materials derived from certain hydro-carbons when associated with an alkaline cement have not been successful in practice. This is due principally to the fact that the full set of an alkaline cement is not procured when it is associated with certain pitchy materials. It is also known that so called alkaline concretes and mortars in commercial form condense moisture, which is very undesirable for obvious reasons. Further, it is known that alkaline concretes and mortars, when set, are quite brittle, possessing no elasticity.

It is the principal object of the present invention to overcome these disadvantageous features and to provide, first, a cementitious plastic composition in which the full set of an alkaline cement is secured when associated with fillers coated with certain pitchy material; second, to provide a cementitious plastic composition which when set is proof against water absorption and surface condensation; and third, to provide a cementitious plastic composition, which, when set, possesses considerable elasticity.

With these and other objects in view, the invention consists of the improvements hereinafter described and finally claimed.

The nature, characteristic features and scope of the invention will be more fully understood from the following description.

In practising the invention, there is preferably placed in a mixing machine, earthy materials which may be natural soil (common earth), gravel, sand, stone-dust, stone-grit, and the like. These materials may be used singly or combinedly. Ashes and fibers may be employed if desired. Calcium oxid in dry powdery form is then added to the material within the mixer. Upon an intimate mixture being secured, hot water, preferably at the boiling point is next added to the mixture to induce a quick slaking of the calcium oxid. The calcium oxid will as a mass immediately begin to actively slake and at the height of the chemical heat resulting, there is added to the mass within the mixing machine, about four parts of a certain hot liquid pitchy material (hereinafter described) to approximately each part of calcium oxid used. When this mass is well mixed together, one additional part of calcium oxid, in dry powdery form, is added to induce granulation of the mass. After adding said calcium oxid, but one or two rotations of the mixing blades of the mixer are permitted and then there is finally added to the mass within the mixer, cement, in the form of a thin mortar, giving an alkaline reaction, about one part cement to every four parts in bulk of the mass being used. It is to be noted at this point, that during the above steps in the method of making the plastic composition, that the mixing machine has been operating continuously, to induce a thorough mixture of the various ingredients used. After adding the thin mortar above referred to, the mixing machine is permitted to operate until the proper mixture is procured, at which time, the plastic composition is removed and at once utilized for constructing desired commodities. The plastic composition thus provided, secures the full set of the alkaline cement used; secures the binding effect of the pitchy material used and when set, possesses water-proofing qualities and a desired amount of elasticity.

In explanation of these results, it may be stated, that in the first instance, by mixing the calcium oxid with the earthy material and exciting the calcium oxid to slake, water contained in the earthy material is taken up and partly converted and partly vaporized and the earthy material made very hot and dry. Preferably only sufficient hot water is used to excite the calcium oxid to slake, so that when the hot pitchy material is introduced, a hot vapor will ascend causing a violent fomentation. This violent fomentation assists efficiently in the mixing of the mass. The second quantity of calcium oxid introduced, slakes, because of the remaining moisture and heat in the mass. In slaking, the calcium oxid will expand three and one-half (3½) measures and will cause the plastic composition as a whole to lift, spread and become granular, in which condition it is very easy to mix with the alkaline cement. The pitchy coated earthy materials become covered with the calcium hydroxid formed from the calcium oxid and water. The essential and volatile elements of the pitchy material thus become fixed, because of the converging and toughening effects of the calcium oxid and will not flow or spread to effect detrimentally, the alkaline cement. Partly owing to this fact, the full set of the alkaline cement is secured; but the chief reason therefor resides in the fact that the presence of calcium hydroxid prevents the pitchy material used from neutralizing the lime element within the alkaline cement.

In further explanation of the results obtained, it may be stated that the pitchy material used may be at least one of two groups of hydro-carbons as known in the art to which this invention relates, to wit: a bituminous material or a resinous material. Of these two groups of hydro-carbons, group 1, embraces asphaltum, maltha, petroleum residuum, coal tar and coke tar. The other, or group 2, embraces what is known in trade parlance as hard pitch, which is a residuum from turpentine manufacture. The pitchy material of either of these groups should be substantially of about the same weight as water, that is about seven pounds to the gallon. Preferably, however, I employ pitchy material weighing slightly in excess of water, although this is not essential. Ordinarily, pitchy material from either of the above mentioned groups, if lighter than water, would form an emulsion with water, thereby preventing the set of an alkaline cement. In the present case, however, the calcium oxid used serves to stiffen and harden the pitchy material, thereby tending to prevent the formation of emulsion.

What I claim is:

1. The herein described method of making a cementitious plastic composition, which consists of the following steps: first, associating calcium oxid in dry powdery form with earthy material; second, adding water to induce slaking of said calcium oxid; third, at the height of the chemical heat resulting, adding a hot liquid pitchy material; fourth, adding additional calcium oxid to induce granulation of the mass, and finally adding cement in the form of a thin mortar, giving an alkaline reaction, during which steps the mass has been continuously agitated to provide a thorough mixture.

2. The herein described method of making a cementitious plastic composition, which consists of the following steps: first, associating calcium oxid in dry powdery form with earthy material; second, adding water to induce slaking of said calcium oxid; third, at the height of the chemical heat resulting adding four parts of a hot liquid pitchy material to approximately each part of calcium oxid employed; fourth, adding an additional part of calcium oxid to induce granulation of the mass and finally adding about one part of cement in the form of a thin mortar, giving an alkaline reaction to every four parts in bulk of said mass, during which steps the mass has been continuously agitated to induce a thorough mixture.

In testimony whereof, I have hereunto signed my name.

JOSEPH HAY AMIES.

Witnesses:
 WILLIAM J. JACKSON,
 AGNES E. CASKEY.